United States Patent [19]

Hayashi et al.

[11] 3,949,176
[45] Apr. 6, 1976

[54] METHOD OF AND APPARATUS FOR ALL BUSY DETECTION

[75] Inventors: Yoshiro Hayashi, Tokyo; Takeaki Yamagata, Hachioji; Akio Otani, Yokohama; Tadashi Minami, Yokohama; Kuniomi Aizawa, Yokohama, all of Japan

[73] Assignees: Hitachi, Ltd.; Japanese National Railways, both of Japan

[22] Filed: Jan. 29, 1974

[21] Appl. No.: 437,679

[30] Foreign Application Priority Data
Jan. 31, 1973 Japan.............................. 48-11937

[52] U.S. Cl. ............................................ 179/18 AB
[51] Int. Cl.² ......................................... H04M 3/22
[58] Field of Search ........ 179/18 AB, 18 FF, 18 FG

[56] References Cited
UNITED STATES PATENTS

| | | | |
|---|---|---|---|
| 3,202,767 | 8/1965 | Warman | 179/18 FG |
| 3,406,258 | 10/1968 | Peeters et al. | 179/18 AB |
| 3,532,830 | 10/1970 | Wirsing | 179/18 AB |
| 3,754,103 | 8/1973 | Revel | 179/18 FF |
| 3,770,899 | 11/1973 | Kobus et al. | 179/18 FG |

*Primary Examiner*—Thomas W. Brown
*Attorney, Agent, or Firm*—Craig & Antonelli

[57] ABSTRACT

A method of and an apparatus for detecting the all make busy state of a line concentrator or an exchange in which all outgoing circuits are divided into a plurality of groups, at least one circuit is specified from each of the groups, the specified circuits are successively scanned with a scanning signal producing therefrom a plurality of phase pulse signals having phase ranges resulting from dividing phase ranges by at least the number of the specified circuits of the groups corresponding to the latter phase ranges which are one period of the scanning signal divided by the number of the groups, the busy state of the specified circuit of a group is detected to decide the busy state of the group, and the busy states of all groups at one cycle of the scanning are detected to detect the all make busy state of the line concentrator or the exchange.

11 Claims, 2 Drawing Figures

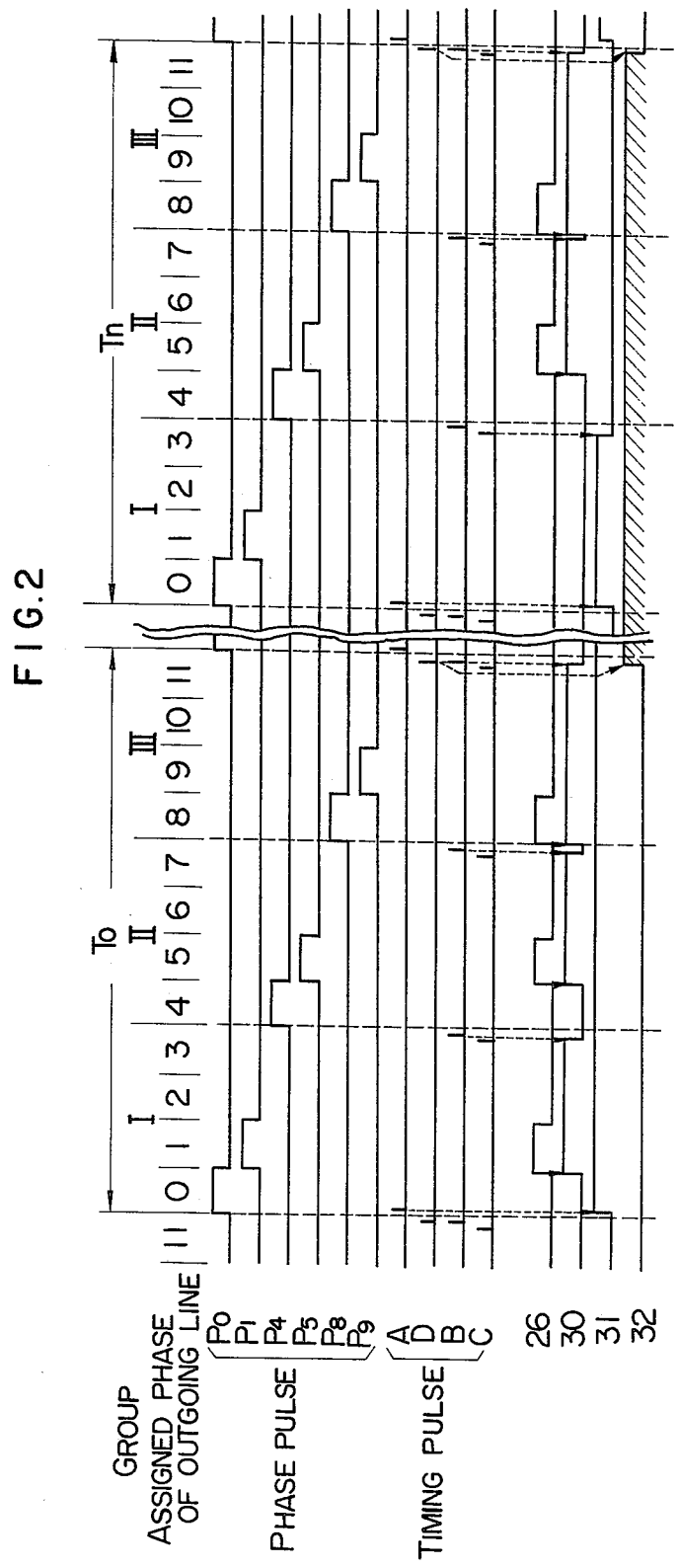

METHOD OF AND APPARATUS FOR ALL BUSY DETECTION

BACKGROUND OF THE INVENTION

1. Field of the Invention

The present invention relates to a method of and an apparatus for all make busy detection of a line concentrator, exchange or the like used in a data communications system.

2. Description of the Prior Art

Generally, for a line concentrator or an exchange the function of making all incoming circuits busy when all outgoing circuits are made busy by the problem in a higher ranked unit or circuit disconnection, i.e. the all make busy function is necessary. For this purpose, in the past all the outgoing lines were supervised to detect the time at which all outgoing lines become busy. In this case, however, it is necessary to detect whether or not an outgoing line is in use to separate it.

As a result, even a circuit which seldom operates has the above-described detecting function, so that the circuit becomes complicated and uneconomical. Furthermore, there is the disadvantage that when it is necessary to temporarily interrupt the call for the terminal by, for example, in necessity of the testing the higher ranked unit, all the outgoing circuits of the higher ranked unit must be made busy, requiring a time-consuming operation. The degree of this disadvantage becomes greater as the number of the outgoing circuits of the line concentrator or exchange becomes larger.

To facilitate the operation of the higher ranked equipment it has been a practice that a special signal line is provided between the line concentrator or the exchange and the higher ranked unit for transmitting the signal indicating the trouble in the higher ranked unit. However, this expedient has the disadvantage that it requires an additional circuit and it is necessary to supervise the state of the circuit for detecting the circuit breakage, resulting in the circuit complication.

SUMMARY OF THE INVENTION

The all make busy function is that the problem in the higher ranked equipment including the outgoing circuits is detected and the disposition thereof is performed for the terminals. Consequently, even if the all make busy is defined for the case in which problems are detected for circuits of more than a predetermined proportion of the outgoing circuits, the all make busy function is seldom in the wrong only if the circuit quality and the reliability of the central equipment are sufficient.

In a method of supervising a predetermined proportion of the total outgoing lines, however, the supervising circuit thereof is not simplified at all. Consequently, if the outgoing lines of a predetermined proportion are fixed, if these outgoing lines only are supervised, and if they are controlled in a time sharing manner, the supervising circuit can be simplified.

An object of the present invention is to provide an all make busy detecting method for promptly deciding all busy by scanning specified circuits.

Another object of the present invention is to provide an all make busy detecting apparatus of a simple circuit construction without requiring a special supervising line.

According to the present invention there is provided a method of detecting an all busy state of a line concentrator or an exchange comprising the steps of dividing outgoing circuits into a plurality of groups, specifying at least one circuit from each group, successively scanning the specified circuits with a scanning signal to derive therefrom busy signals existing thereon, one period of said scanning signal being divided by at least the number of said specified circuits, phase pulses having the divided phases of said period being applied to the corresponding specified circuit, deciding the busy state of the group of the circuit from which the busy signal was derived, and detecting the busy state of all groups at one period of the scanning signal to determine an all make busy state of said line concentrator or exchange.

BRIEF DESCRIPTION OF THE DRAWING

FIG. 2 is a timing chart for explaining the operation of the circuit of FIG. 1.

DESCRIPTION OF THE PREFERRED EMBODIMENT

Figure 1:
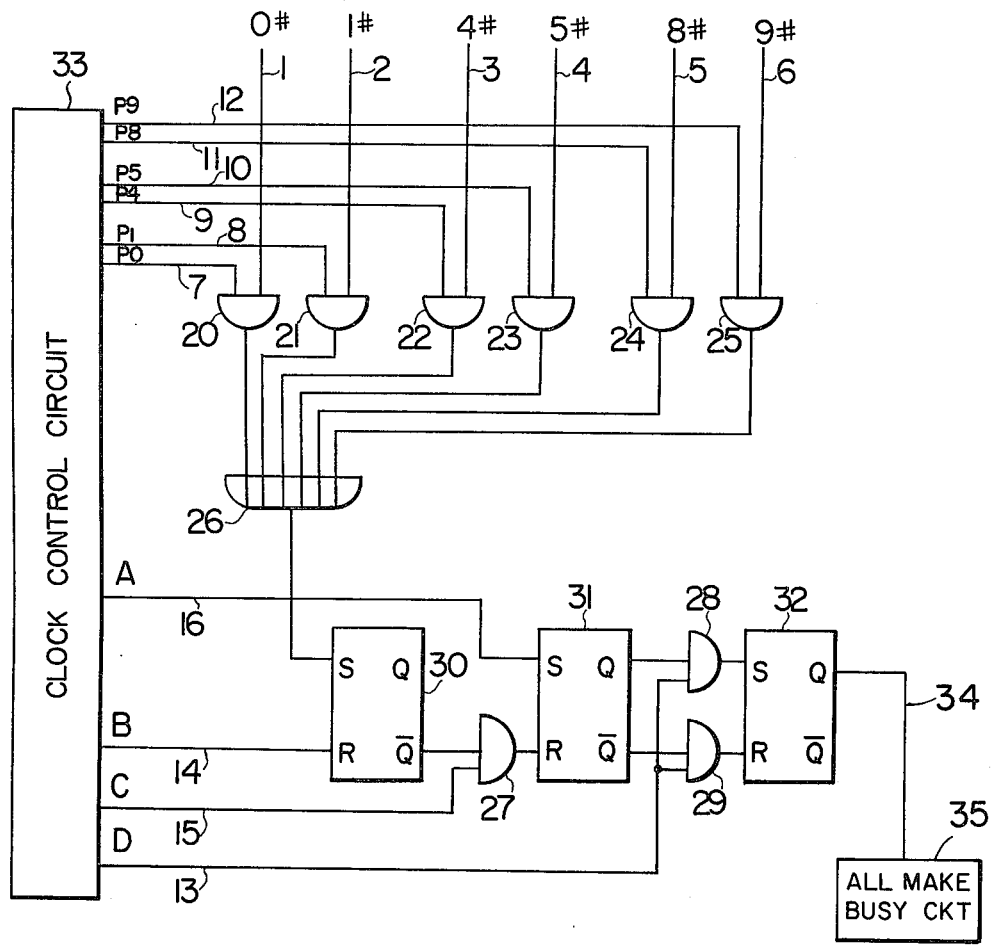
FIG. 1 is a block diagram of the circuit construction of an embodiment of the present invention.

In the following description there will be explained, referring to FIGS. 1 and 2, an embodiment of the present invention in which 12 outgoing circuits are divided into three groups each consisting of four circuits, group I (0# – 3#), group II (4# – 7#) and group III (8# – 11#), the lower numbered two circuits of each group, (0# and 1#), (4# and 5#) and (8# and 9#), are supervised and the all make busy is detected while scanning these circuits with the phase signals corresponding thereto.

In FIG. 1 a clock control circuit 33 generates phase pulses for scanning outgoing lines and timing pulses for setting or resetting memory circuits 30, 31 and 32.

Signals $P_0$, $P_1$, $P_4$, $P_5$, $P_8$ and $P_9$ appearing on signal lines 7 to 12 are pulses obtained by dividing one period T by the number 12 of the outgoing circuits and correspond to the outgoing lines 0#, 1#, 4#, 5#, 8# and 9#, respectively. They are as shown in FIG. 2.

A timing pulse A appearing on a signal line 16 appears at the beginning of one period as shown in FIG. 2 and acts to set the memory circuit 31.

A timing pulse D on a signal line 13 appears at the end of the one period as shown in FIG. 2 and determines the timing of setting or resetting the memory circuit 32 depending on the output of the memory circuit 31.

A timing pulse B on a signal line 14 appears at the end of the scanning period of each group as shown in FIG. 2 and resets the memory circuit 30.

A timing pulse C on a signal line 15 appears at the end of the scanning period of each group as shown in FIG. 2, but slightly earlier than the timing pulse B, and determines the timing of resetting the memory circuit 31 depending on the reset output $\overline{Q}$ of the memory 30.

Signal lines 1 to 6 in FIG. 1 correspond to the outgoing circuits 0#, 1#, 3#, 4#, 8# and 9#, respectively, and indicate the state of the outgoing lines. The indication of the busy state of the outgoing line is "1".

Reference numerals 20 to 25 designate AND circuits. When, for example, the outgoing circuit 0# is busy, the corresponding signal line 1 is at the state "1". Consequently, at the AND gate 20 it coincides with the phase pulse $P_0$ so that the output of the AND circuit 20 is the same one as the phase pulse $P_0$ which is supplied to the set input S of the memory circuit 30 through an OR circuit 26. Reference characters S, R, Q and $\overline{Q}$ in the memory circuits 30, 31 and 32 designate set and reset inputs and set and reset outputs, respectively.

When the memory circuit 32 is in a set state, namely, when the set output Q is made "1" and a signal indicating the state "1" appears on the signal line 34, it is considered that an all make busy state is detected. A circuit 35 (all make busy circuit) makes all incoming lines busy by means of the signal indicating the state "1".

If it is assumed that the outgoing circuits 1#, 5# and 8# are busy at a period $T_0$ so that the condition of all make busy stands, the output of the OR circuit 26 is such a signal as becoming a "1" at the phases 1, 5 and 8 as designated by the reference numeral 26 in FIG. 2. The memory circuit 30 is set by the output of the OR circuit 26 and reset by the timing pulse B so that the operation thereof is as indicated by the reference numeral 30 in FIG. 2.

The memory circuit 31 is set by the timing pulse A, that is, it is set at the beginning of a period and is reset by the output signal of the AND circuit 27. However, since the memory circuit 30 is set at the time of the timing pulse C, the reset output $\overline{Q}$ thereof is a "0". Consequently, the inputs to the AND circuit 27 do not coincide so that the output of the AND gate 27 is null or 0. Thus, the memory circuit 31 is not reset until the end of a period, and the outputs Q and $\overline{Q}$ thereof hold the states "1" and "0", respectively. Consequently, the coincidence between input signals to the AND gate 28 can be obtained at the time of an appearance of the timing pulse D, so that the memory circuit 32 is set and an all make busy state may be established through the circuit 35.

Thereafter a similar operation is performed at every period, so that the memory circuit 32 remains set to hold an all make busy state.

If it is assumed that the outgoing circuit 1# is restored at a period $T_n$, the output pulses of the OR circuit 26 do not contain the phase pulses of the outgoing circuits 0# and 1#. Consequently, the memory circuit 30 is not set during the period of the I group, so that the output $\overline{Q}$ thereof is "1". Thus, since the inputs to the AND circuit 27 coincide, the memory circuit 31 is reset at the end of the period of the I group to set its outputs Q and $\overline{Q}$ at "0" and "1", respectively.

Since the memory circuit 31 is set only at the time of the timing signal A, i.e. only at the beginning of a period, it maintains its reset state until the end of the period. Consequently, the inputs to the AND circuit 29 coincide at the time of the timing pulse D, so that the memory circuit 32 is reset to release the make busy state.

In the above embodiment twelve outgoing circuits are divided into three groups. However, the present invention can be applied to any number of outgoing circuits and any number of groups by changing the timing pulses.

The above embodiment is an example in which the phase pulses have the duration equal to the width of one period divided by the number of the outgoing circuits. Since, however, the outgoing line phases 2, 6 and 10 in FIG. 2 are unrelated to the operation of the system, these phase parts can be eliminated. Consequently, such phase pulses can be utilized as obtained by positioning the timing pulses D, B and C at the ends of individual periods and by dividing the period by the number of specified circuits.

What is claimed is:

1. A method of detecting an all make busy state of a predetermined number of outgoing circuits comprising the steps of:
   forming the predetermined number of outgoing circuits into a plurality of groups;
   specifying at least one circuit and less than all the circuits of each group as the at least one circuit to be detected as an all make busy indication for each group;
   successively scanning the specified circuits for each group with a scanning signal to derive therefrom busy signals existing thereon, the scanning signal having a predetermined period and including phase pulses each of which has a phase which is obtained from dividing said predetermined period by the number of said groups and further dividing the resultant time interval which corresponds to each group by at least the number of specified circuits of the group, and applying the phase pulse to a corresponding specified circuit;
   detecting the busy state of each group of the outgoing circuits by detecting the busy signal from the at least one specified circuit in each group; and
   detecting the busy state of all of the groups of the outgoing circuits during one period of the scanning signal as an indication of the all make busy state of the predetermined number of outgoing circuits.

2. A method according to claim 1, further comprising signaling the all make busy state of the predetermined number of outgoing circuits.

3. A method according to claim 1, wherein the step of forming the predetermined number of outgoing circuits into a plurality of groups includes forming each group with an equal number of outgoing circuits.

4. An apparatus for detecting an all make busy state of a predetermined number of outgoing circuits comprising:
   a plurality of busy detecting means provided for respective groups of the outgoing circuits, each of said groups being constituted of a defined plurality of outgoing circuits of said predetermined number of outgoing circuits and including at least one specified circuit and less than all the outgoing circuits of the group, each of said busy detecting means operating to detect the existence of a busy signal on the at least one specified circuit in each group;
   a first memory means for generating a signal indicating the busy state of a group said first memory means being set by the busy signal within a time interval corresponding to said group, said busy signal being detected by the busy detecting means corresponding to said group, said first memory means being reset at a time moment (B) indicating the end of said time interval corresponding to said group;
   a second memory means being set at the time amount (A) at the beginning of one period, and being reset at the end of said time interval corresponding to each group when said first memory means has been reset at a time moment (C) prior to said resetting time moment (B) of said first memory means; and
   a third memory means for generating an all make busy signal when said second memory means is set at the end (D) of the one period.

5. An apparatus according to claim 4, further comprising scanning signal generator means for generating:
a plurality of phase pulse signals each having a phase which is obtained from dividing one period by the number of said groups and further dividing a time interval corresponding to each group by at least the number of specified outgoing circuits in said group;
a timing pulse (A) indicating the beginning of said one period;
a timing pulse (D) indicating the end of said one period;
a timing pulse (B) indicating the end of said time interval corresponding to each group; and
a timing pulse (C) appearing a short time prior to said timing pulse (B).

6. An apparatus according to claim 5, further comprising circuit means responsive to the all make busy signal from said third memory means for indicating the all make busy state of the predetermined number of outgoing circuits.

7. An apparatus according to claim 5, wherein said plurality of busy detecting means includes a plurality of AND gates, each of said AND gates receiving a first input from a respective one of said specified circuits and a second input of a phase pulse for the corresponding specified circuit, each AND gate providing an output upon coincidence of the phase pulse and a busy signal indication on the specified circuit at the inputs thereof, each of said AND gates providing an output to an OR gate which provides an output corresponding to the inputs thereto.

8. An apparatus according to claim 7, wherein said first memory means includes a first flip-flop having the output of said OR gate applied to the set input thereof and the timing pulse (B) applied to the reset input thereof, said first flip-flop providing an output on the reset output thereof indicative of the busy signal of each group.

9. An apparatus according to claim 8, where in the second memory means includes a second flip-flop receiving the timing pulse (A) at the set input, an AND gate having a first input connected to the reset output of said first flip-flop and a second input for receiving the timing pulse (C), said AND gate providing an output to the reset input of said second flip-flop, said second flip-flop providing an output on the set output thereof in response to a signal at the set input and an output on the reset output thereof in response to a signal at the reset input.

10. An apparatus according to claim 9, wherein the third memory means includes a third flip-flp and first and second AND gates, said first and second AND gates having first inputs connected respectively to the set and resets outputs of said second flip-flop and having second inputs for receiving the timing pulse (D), said first and second ANd gates respectively providing outputs to the set and reset inputs of said third flip-flop, said third flip-flop generating an all make busy signal on the set output thereof when said second flip-flop is set at the end of one period.

11. An apparatus according to claim 10, further comprising circuit means responsive to the all make busy signal from said third flip-flop for indicating the all make busy state of the predetermined number of outgoing circuits.

* * * * *